3,396,134
WAX COMPOSITIONS HAVING SUPERIOR FAST TACK PROPERTY
Eugene R. Cox, Ponca City, Okla., assignor to Continental Oil Company, Ponca City, Okla., a corporation of Delaware
No Drawing. Filed Sept. 13, 1965, Ser. No. 487,051
2 Claims. (Cl. 260—28.5)

ABSTRACT OF THE DISCLOSURE

Composition of matter, having superior fast tack property, comprising: petroleum wax, ethylene-vinyl acetate copolymer, alpha-methyl styrene–vinyl toluene copolymer, and butyl rubber.

In one aspect the invention relates to a method of coating glassine paper using the above-described composition.

Disclosure

The present invention relates to a wax composition which is useful for coating paper, such as glassine and the like. More particularly, the present invention relates to a highly viscous wax composition having superior fast tack property which is useful for coating glassine paper and the like.

Many types of materials have been used for the packaging of foodstuffs. Heretofore, a material such as "Saran" coated glassine has been used for the packaging of foodstuffs, such as potato chips, corn chips, dehydrated foods and the like. While this material is satisfactory, it has the disadvantage of being relatively expensive.

One of the requirements which must be met in a composition used for coating glassine, which is to be used as described above, is that the composition have a "fast tack." The term "fast tack," which is well known to those in the packaging art, refers to the ability of the composition on the package to seal in a short weld time. Fast tack is necessary for high speed operation of packaging machines.

In an attempt to develop a coating composition for glassine and the like, which composition is less expensive than "Saran," attention has been directed to wax-containing compositions, and particularly compositions containing wax and ethylene-vinyl acetate copolymer. While several advantages exist with the wax/ethylene-vinyl acetate copolymer compositions, the compositions have a disadvantage of not having superior fast tack performance. Unexpectedly, I have discovered a composition containing wax and a wax-extendible copolymer, such as ethylene-vinyl acetate copolymer, which possesses superior fast tack.

It is an object of the present invention to provide a superior composition for coating glassine and the like.

It is another object of the present invention to provide a composition for coating glassine and the like, which composition has superior fast tack properties.

It is still another object of the present invention to provide an improved method of preparing coated glassine paper wherein the method comprises the use of a composition as described herein, having a superior fast tack property.

Broadly stated, the present invention relates to a composition, having superior fast tack properties, comprising, in parts by weight:

| | |
|---|---|
| Petroleum wax | 30 to 55 |
| Wax-extendible copolymer, preferably ethylene-vinyl acetate copolymer | 24 to 40 |
| α-Methyl styrene–vinyl toluene copolymer | 15 to 30 |
| Butyl rubber or polyisobutylene | 0.25 to 5 |

A preferred composition of the present invention comprises, in parts by weight:

| | |
|---|---|
| Paraffin wax | 30 to 55 |
| Ethylene-vinyl acetate copolymer containing 16–34% (weight) vinyl acetate and having a melt index of about 1 to about 3 | 12 to 20 |
| Ethylene-vinyl acetate copolymer containing 16–34% (weight) vinyl acetate and having a melt index of about 5 to about 7 | 12 to 20 |
| α-Methyl styrene–vinyl toluene copolymer having a ring-and-ball melting point of about 100 to about 130° C. | 15 to 30 |
| Butyl rubber | 0.25 to 5 |

More preferably, the composition of the present invention comprises, in parts by weight:

| | |
|---|---|
| Paraffin wax | 35 to 50 |
| Ethylene-vinyl acetate copolymer containing 24–30% (weight) vinyl acetate and having a melt index of about 1 to about 3 | 14 to 18 |
| Ethylene-vinyl acetate copolymer containing 24–30% (weight) vinyl acetate and having a melt index of about 5 to about 7 | 14 to 18 |
| α-Methyl styrene–vinyl toluene copolymer having a ring-and-ball melting point of about 100 to about 130° C. | 18 to 28 |
| Butyl rubber | 0.5 to 2 |

In one aspect, the invention relates to an improved method of coating glassine paper, said method comprising using the above-described composition.

The term "petroleum wax" as used herein refers to paraffin wax, microcrystalline wax or mixtures thereof.

The term "paraffin wax" is used to define the hard, crystalline wax commonly obtained from petroleum distillates, derived from mineral oils of the mixed-base or paraffin-base type. By the present refining methods, crude petroleum oil is subjected to distillation whereby it is separated into a series of fractions known as "paraffin distillates." The wax is separated from the paraffin distillate by chilling and filtering or by the use of a solvent, as for example, propane or a ketone such as methyl ethyl ketone. The wax obtained by either of these two methods contains from 10 to 50 percent oil and is generally referred ot as "slack wax." This slack wax is subjected to a "sweating operation" to remove the oil. By proper sweating the oil content may be reduced to less than 1 percent. Also, the oil content may be reduced to an acceptable value by other methods such as solvent deoiling or press deoiling. The final product is known as "refined wax" or "paraffin wax" and is graded according to the tensile strength, melting point, oil content, hardness, etc. Preferably, the paraffin waxes used in my composition have an ASTM melting point in the range of about 125 to about 160° F., and have an oil content of about 1 percent or less.

The paraffin waxes are preferred for use in my composition.

The term "microcrystalline wax" refers to a wax material which is obtained usually from the residual product of the vacuum distillation of lubricating oils. In general, microcrystalline waxes contain only very minor quantities of straight chain paraffinic hydrocarbons. For additional information concerning the properties and preparation of microcrystalline waxes, we refer to U.S. Patent No. 2,983,664 by Concetto T. Camilli. Preferably, the microcrystalline waxes used in my composition have an ASTM melting point in the range of about 125 to about 190° F.

Ethylene-vinyl acetate copolymers are prepared by copolymerizing a mixture of ethylene and vinyl acetate in the presence of a free radical catalyst, e.g., tertiary butyl hydroperoxide, in a suitable reactor at elevated temperatures and pressures. The copolymers are usually identified by a combination of the ratios of the co-monomers present in the product and by the melt index. The test for determining melt index (ASTM D1238–57T) consists of determining the amount in grams (melt index value) of the copolymer that can be pressed through a standard orifice in ten minutes at 190° C. with a piston weighing 2160 grams. Suitable ethylene-vinyl acetate copolymers for use in my invention contain from about 66 to about 84 percent ethylene (by weight) and from about 16 to about 34 percent vinyl acetate (by weight) and have melt indexes in the range of from about 1 to about 7. Preferably, the ethylene-vinyl acetate copolymers used in my invention contain from about 70 to about 76 percent ethylene (by weight) and from about 24 to about 30 percent vinyl acetate (by weight) and have melt indexes in the range of from about 1 to about 7.

Ethylene-vinyl acetate copolymers are available in commercial quantities from E. I. du Pont de Nemours & Co., Inc., and are sold under the "Elvax" trademark. Properties of various "Elvax" copolymers are as follows:

| Property | Elvax 360 | Elvax 260 | Elvax 250 | Elvax 240 | Elvax 220 | Elvax 150 |
|---|---|---|---|---|---|---|
| Co-monomer ratios, percent: | | | | | | |
| Ethylene | 76–74 | 73–71 | 73–71 | 73–71 | 73–71 | 78–72 |
| Vinyl acetate | 24–26 | 27–29 | 27–29 | 27–29 | 27–29 | 22–28 |
| Melt index [1] | 1–3 | 5–7 | 12–18 | 22–28 | 125–127 | 32–34 |
| Density at 23° C | .95 | .954 | .951 | .951 | .949 | .957 |
| Refractive index, 25° C., D line | 1.491 | 1.485 | 1.485 | 1.485 | 1.485 | 1.482 |
| Softening point, ring-and-ball, ° F | 370 | 310 | 280 | 250 | 192 | 248 |

[1] The melt index is determined by ASTM method No. D1238–57T.

It is of interest that I have found that compositions containing a mixture of ethylene-vinyl acetate copolymers have superior properties when coating glassine, as compared to compositions containing a single ethylene-vinyl acetate copolymer. More particularly, I have found that a mixture of ethylene-vinyl acetate copolymer, wherein one has a melt index in the range of about 1 to about 3 and wherein the other has a melt index in the range of about 5 to about 7, gives improved results. For this reason, a mixture of the hereinbefore defined copolymers is preferred in my invention.

The α-methyl styrene-vinyl toluene copolymers which are used in the composition of my invention contain from about 25 to about 35 percent (by weight) alpha-methyl styrene and from about 75 to about 65 percent (by weight) vinyl toluene. The suitable copolymers have a ball-and-ring softening point in the range of about 100° C. to about 130° C. Preferably, the copolymer has a ball-and-ring softening point of about 120° C. These copolymers are described more completely in U.S. Patent No. 3,000,868, which is made a part of this disclosure. The materials are available commercially from the Pennsylvania Industrial Chemical Corp. under the trademark "Piccotex." Typical properties of two grades of "Piccotex" are shown below.

| | Piccotex 100 | Piccotex 120 |
|---|---|---|
| Softening point, ball-and-ring, ° C | 100 | 120 |
| Color, Gardner scale (maximum) | 1 | 1 |
| Specific gravity | 1.04 | 1.04 |
| Pounds per gal., solid resin | 8.67 | 8.67 |
| Gardner viscosity, in toluene at 25° C | (1) | (2) |
| Gardner viscosity, in 55% mineral spirits | | T–V |
| Acid number, less than | 1 | 1 |
| Saponification No., less than | 1 | 1 |
| Bromine No., (electrometric) less than | 1 | 1 |
| Ash, less than, percent | 0.1 | 0.1 |
| Refractive index at 25° C | 1.583 | 1.583 |
| Ozone No | 0 | 0 |
| Flash point, ° F | 500 | 500 |
| Fire point, ° F | 550 | 550 |

[1] Q at 70% solids.
[2] L at 65% solids.

The inclusion of polyisobutylene or butyl rubber is an important feature of my composition in that I have found that omission of this material results in poor fast tack properties for the composition. While polyisobutylene is suitable in my composition, butyl rubber is preferred, with butyl rubber having a Mooney viscosity (ML–8 at 125° C.) of at least 60 being especially preferred. The term butyl rubber refers to copolymers of isobutylene and isoprene, wherein only a small amount (i.e., 1.5–4.5%) of isoprene is present. Butyl rubber usually has a molecular weight of 300,000 (Flory) or higher. The preparation of butyl rubber is described in "Textbook of Polymer Science" by Fred W. Billmeyer, Jr., published by Interscience Publishers, New York, 1962 (pages 388–389).

Commercial butyl rubber usually contains small amounts of antioxidants. Many of these commercial butyl rubbers have been cleared by the Food and Drug Administration. Examples of two suitable butyl rubbers are B–21 and B–28, sold by Enjay Chemical Co., New York. In this connection, any butyl rubber which has been cleared by the Food and Drug Administration and having a Mooney viscosity as defined above is suitable for use in my composition.

I have found that in addition to using butyl rubber per se in my composition, I can also use wax compositions containing butyl rubber. Examples of wax compositions containing butyl rubber are "Polaffine 25" and "Polaffine 30," available from Moore and Munger, New York. These wax compositions contain 25 percent and 30 percent (weight) butyl rubber, respectively.

In order to disclose the nature of the present invention still more clearly, the following illustrative examples will be given, in which parts used are parts by weight.

EXAMPLES

The compositions used in these examples were applied to glassine paper using a laboratory coater. The compositions were applied at coating weights in the range of 9 to 11 pounds per ream. The laboratory coater consisted of a rotating hot applicator roll, which was immersed in the composition, and a metering knife. The glassine paper was pulled through the coater manually, first kissing the applicator roll and then going through the metering station where coating was doctored to the desired coating weight. Coating weights were controlled by the speed of travel over the doctor knife, pressure on the paper in the metering station, and viscosity of the blend and temperature of the blend.

The glassine paper used in these examples was commercial production from Rhinelander Paper Co., Rhinelander, Wis.

The test procedure used for measuring hot tack was as follows:

The test employs a spring tester which is cut from 0.007 inch spring steel sheet. The testers are 8 inches long and 3 inches in width at each end. Starting at about 1 inch from both ends the tester narrows circumferentially (i.e., concave viewed from the side) so that the center of the tester is only about 11/32 inch to about 16/32 inch wide. The strength of the tester is dependent on this width at the center. When used to measure hot tack, the tester is flexed end-to-end. An Instron Tester is used to calibrate the spring tester.

Samples of coated material cut 3 inches wide by about 14 inches long are sealed coating-to-coating in the form of a loop. This seal is made to join the two ends of the strip into a loop. It is allowed to cool in the normal manner so that a firm bond is formed. The spring tester described above is then inserted, flexed by hand inside the loop, and a second heat seal made *adjacent* to the end of the flexed spring tester. (All test seals were made at a jaw pressure of 30 p.s.i.g., a dwell time of 1 second and at the minimum temperature which was found to produce a paper tearing seal with the coating under test.) Hand pressure is removed from the spring tester during the dwell period so that it is free to exert its full parting force when the heat seal jaw is lifted. At this moment, the spring tends to pull apart while the bond is hot, and thus provides a measure of "hot tack." Spring testers of differing strength are used in the test.

Using the technique described above, the following compositions were tested.

|  | Parts by Weight | | |
| --- | --- | --- | --- |
|  | A | B | C |
| Ethylene-vinyl acetate, copolymer A [1] | 17.5 | 15 | 15 |
| Ethylene-vinyl acetate, copolymer B [2] | 17.5 | 15 | 15 |
| α-Methyl styrene–vinyl toluene copolymer [3] | 25 | 20 | 21.5 |
| Wax containing 30% butyl rubber [4] | 3 | 3 | |
| Paraffin wax [5] | 37 | 47 | 48.5 |

[1] "Elvax" 260.
[2] "Elvax" 360.
[3] "Piccotex" 120.
[4] "Polaffine" B-30.
[5] Having an ASTM melting point of 125-155° F.

The following spring test results were obtained:

| Composition | A | B | C |
| --- | --- | --- | --- |
| 1.17 oz./in | Total seal | Total seal | Fail. |
| 1.28 oz./in | do.[1] | 90% release | Do. |
| Rating of seal quality [2] | 10 | 5 | 0. |

[1] Seal does not release due to spring pressure.
[2] Ratings from 0-10 indicating increasing seal quality.

While particular embodiments of the invention have been described, it will be understood, of course, that the invention is not limited thereto, since many modifications may be made; and it is, therefore contemplated to cover by the appended claims any such modifications as fall within the true spirit and scope of the invention.

The invention having thus been described, what is claimed and desired to be secured by Letters Patent is:

1. A composition of matter, suitable for the coating of paper, consisting essentialy of, in parts by weight:
about 37 parts paraffin wax having an ASTM melting point of 125–155° F.,
about 17.5 parts ethylene-vinyl acetate copolymer containing from about 27 to about 29 percent vinyl acetate and having a melt index of about 5 to about 7,
about 17.5 parts ethylene-vinyl acetate copolymer containing from about 24 to about 26 percent vinyl acetate and having a melt index of about 1 to about 3,
about 25 parts α-methyl styrene–vinyl toluene copolymer, having a ring-and-ball melting point of about 120° C.,
about 3 parts wax containing about 30 percent butyl rubber having a Mooney viscosity (ML–8 at 125° C.) of at least 60.

2. A composition of matter, suitable for the coating of paper, consisting essentially of, in parts by weight:
about 47 parts paraffin wax having an ASTM melting point of 125–155° F.,
about 15 parts ethylene-vinyl acetate copolymer containing from about 27 to about 29 percent vinyl acetate and having a melt index of about 5 to about 7,
about 15 parts ethylene-vinyl acetate copolymer containing from about 24 to about 26 percent vinyl acetate and having a melt index of about 1 to about 3,
about 20 parts α-methyl styrene–vinyl toluene copolymer, having a ring-and-ball melting point of about 120° C.,
about 3 parts wax containing about 30 percent butyl rubber having a Mooney viscosity (ML–8 at 125° C.) of at least 60.

References Cited

UNITED STATES PATENTS

| | | | |
| --- | --- | --- | --- |
| 3,306,882 | 2/1967 | Pullen | 260—28.5 |
| 3,245,931 | 4/1966 | Matthew | 260—28.5 |
| 3,321,427 | 5/1967 | Tyran | 260—28.5 |
| 3,175,986 | 3/1965 | Apikos | 260—28.5 |

JULIUS FROME, *Primary Examiner.*